REPEATER TESTING

Filed Dec. 19, 1963

INVENTOR
S. T. BREWER
BY Leonard M. Arnold
ATTORNEY 3,325,605

REPEATER TESTING

Sherman T. Brewer, Chatham, N.J., assignor to Bell Telephone Laboratories, Incorporated, New York, N.Y., a corporation of New York Filed Dec. 19, 1963, Ser. No. 331,858
4 Claims. (Cl. 179—175.31)

ABSTRACT OF THE DISCLOSURE

Apparatus for locating a faulty one of a plurality of repeaters in a two way repeatered cable which transmits a high frequency signal through the cable from the high frequency transmitting end of the cable and a low frequency signal through the cable from the low frequency transmitting end of the cable. A crystal having a resonant frequency within the pass-band of the high frequency directional filters is connected in parallel with the beta feedback network of each amplifier and each such crystal has a unique predetermined resonant frequency different from that of any other crystal employed in any of the other repeaters in the cable. When the sum of the signals applied to the transmission cable equals the crystal resonant frequency of the particular repeater under test the amplifier in that repeater functions as a modulator and the resulting modulation product can be measured at the low frequency end of the transmitting cable yielding an indication of the operativeness of the repeater.

Figure 1:
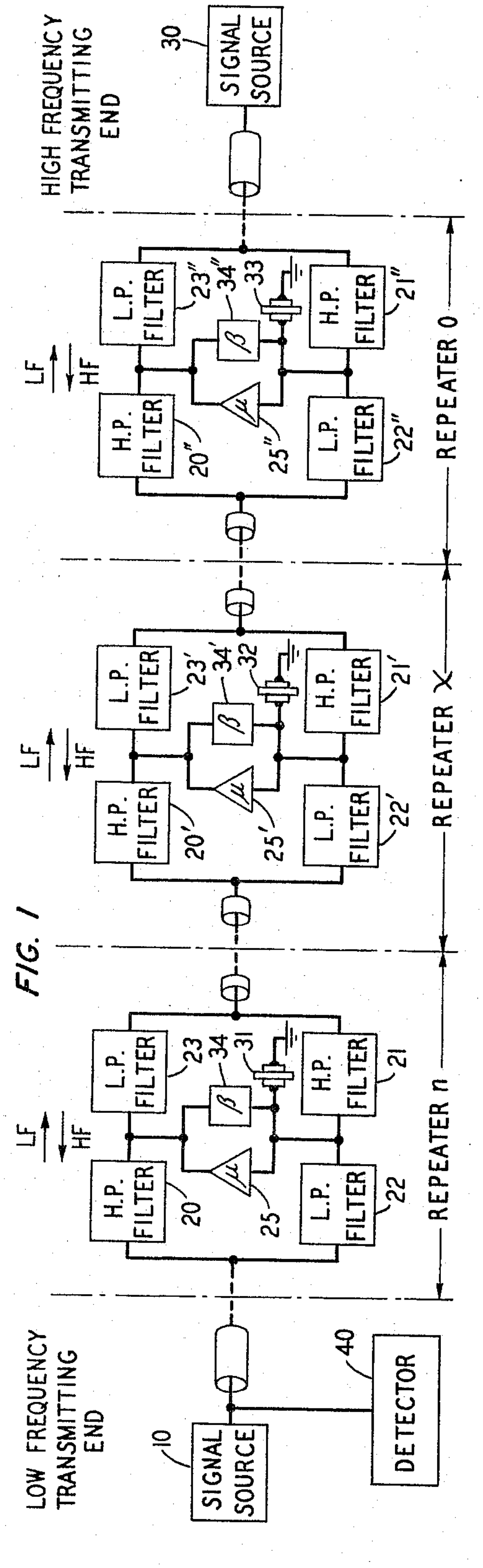

This invention relates to testing systems for the repeaters or amplifiers associated with long inaccessible electrical transmission systems and more particularly to the testing of two-way repeaters in a two frequency band system in which two-way communication is accomplished over a transmission line.

One type of telephone submarine cable system makes use of two cables, one for transmission in each direction, and a technique for testing the repeaters in the system is disclosed in United States Patent 2,580,097 which issued to L. M. Ilgenfritz and R. W. Ketchledge on Dec. 25, 1951. In that system a piezoelectric crystal is connected in shunt with the feedback network of each amplifier in each repeater in the cable and serves to sharply decrease the feedback from the output to the input of the amplifier at the resonant frequency of the crystal. As a result, when there is transmitted over the cable a signal which is the same as the crystal resonant frequency, the gain of the amplifier of that repeater is greatly increased.

To facilitate the testing of the repeaters in such a two cable system each repeater is assigned a crystal having a resonant frequency unique to that repeater. Two techniques are thereby made available for testing the repeaters. The first consists of connecting a noise meter to either end of each cable, and examining the noise present. At each crystal resonant frequency there should be a relatively large amount of noise while at all other frequencies the noise should be much smaller. Thus, by using a detector to check the presence of noise and "working back" from the terminal to whic the detector is connected until the absence of noise at a crystal resonant frequency is noted the probable location of a repeater failure may be determined. In addition, a test oscillator may be connected to a first cable at one end of the system, and the cables coupled together at the other end by means of a bandpass filter. A detector is then connected to the end of the second cable at the first end of the system and the test oscillator output swept across the crystal resonant frequencies and the response of the detector noted. In the event one or more of the repeaters are not operating properly there will be no increase in amplitude corresponding to the crystal resonant frequency and, as a result, the amplifiers in the repeaters may be readily checked.

The above described techniques are effective in testing the repeaters and also economical in the sense that the only apparatus added to the cable is a single crystal connected in feedback network of the amplifier of each repeater. Unfortunately, these techniques are not immediately applicable to the type of telephone submarine cables in which two-way transmission is carried on through a transmission line employing two-way repeaters. In each repeater of that type of system, described on pages 245–276 of the Bell System Technical Journal for January 1957, high-pass and low-pass filters are employed in order to accommodate two-way traffic.

Were crystals employed to short out the feedback of each repeater amplifier in such a two-way system then the first technique described above is not applicable since the crystal resonant frequency would have to be within either the high or low frequency transmission bands and at best only half the filters could be tested by that technique. In addition, the technique of sweeping the various crystal frequencies and measuring the transmitted response is not applicable. For example, since it is only technically feasible to have a single crystal in each beta feedback network either the high-pass or low-pass filters and the amplifiers would be checked by sweeping the crystal frequencies with a test oscillator from one end of the system and measuring the response at the other end, but the other filters could not be checked by this technique, and they could not be checked by sweeping and measuring from opposite ends of the system. As a result, the techniques described in the above mentioned patent are not generally applicable to this type of telephone cable.

Other techniques have been explored for use with two-way repeaters but they all add relatively complicated apparatus to each repeater and, of course, this apparatus is itself subject to failure which may result not only in the loss of ability to test the repeaters but also in adverse effects in the operation of the repeaters themselves. Among such techniques is the so-called loop gain method in which the gain in each repeater is measured by transmitting a supervisory signal in the lower frequency band through the cable from the low frequency transmitting end. Auxiliary apparatus is provided in each repeater for converting the supervisory signal into a value in the upper frequency band and this signal is then transmitted back to the low frequency transmitting end of the cable through the high frequency transmission path in the cable. This procedure is not particularly attractive because of the necessity of adding fairly substantial frequency doubling equipment to each repeater, and such equipment, due to its complexity, is itself subject to failure adding further complications.

Other methods have been tried which make use of the intermodulation products formed with a supervisory signal by the non-linearity of the amplifiers in the repeaters. Generally speaking, such proposals again require additional components in each repeater such as frequency doublers, or devices in the terminal offices which are alien to the carrier-frequency technique, such as pulse transmitters and the like.

It is an object of this invention to simplify the apparatus required in each two-way repeater for testing purposes.

In accordance with this invention the amplifiers and low-pass directional filters in each repeater of a two-way repeatered cable are tested by transmitting a high frequency signal through the cable from the high frequency transmitting end of the cable and transmitting a low frequency signal through the cable from the low frequency transmitting end of the cable, the sum of these signals being equal to the crystal resonant frequency, within the passband of the high frequency directional filters, of a crystal connected in parallel with the beta feedback network of the amplifier in a particular repeater under test to decrease the feedback and cause the amplifier to function as a modulator, and measuring the amplitude of the resulting modulation product at the low frequency transmitting end of the cable. The high-pass channel is tested directly by measuring the noise present at the low frequency transmitting end of the system at each crystal resonant frequency.

Figure 2:
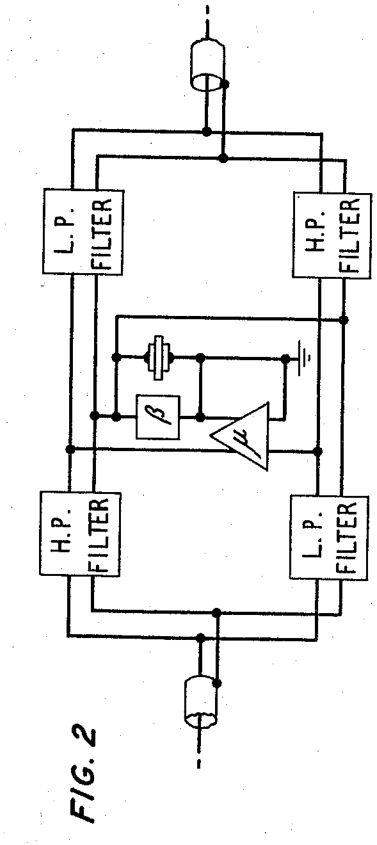

This invention will be more fully comprehended from the following detailed description taken in conjunction with the following drawings in which:

FIG. 1 is a single wire block diagram of a two-way cable system embodying this invention; and FIG. 2 is a two wire block diagram of a two-way repeater embodying this invention.

A test signal within the low frequency transmission band of the cable system is applied by source 10 to the low frequency transmitting end of the two-way communication cable as shown in FIG. 1. Spaced along the cable are two-way repeaters, such as those described in "Repeater Design for the Newfoundland-Nova Scotia Link" by Brockbank, Walker and Welsley on pages 245–276 of the January 1957 issue of the Bell System Technical Journal. While only three repeaters; repeater *n* closest to the low frequency terminal, repeater *o* closest to the high frequency terminal, and a repeater *x* between the above two are shown, it is, of course, understood that many more repeaters may be actually employed in such a submarine cable system. Each repeater comprises a pair of high-pass filters 20, 21; 20′, 21′; 20″, 21″ and a pair of low-pass filters 22, 23; 22′, 23′; 22″, 23″, as well as an amplifier 25; 25′; 25″. Test signals from source 10, which lie in the low frequency band pass through low-pass filter 22 of repeater *n* through the amplifier 25 and thence through low-pass filter 23 to the next section of the cable. Such signals lying in the low frequency band travel through all the repeaters in the same manner until the other end of the cable is reached. At the high frequency transmitting end of the cable a second source of test signals 30 is connected to the cable which source generates signals within the high frequency transmission band of the cable system. These signals from source 30 travel through the cable and through the path in each repeater made up of high-pass filters 21″; 21′; 21, amplifiers 25″; 25′; 25, and high-pass filter 20″; 20′; 20.

Associated with each repeater is a crystal 31, 32, 33 having a resonant frequency peculiar to the particular repeater which is connected to the feedback path so that at its resonant frequency it provides a short circuit reducing the feedback to zero. The feedback normally serves to suppress modulation products. When the sum of the frequencies of the signals generated by sources 10 and 30 are equal to the resonant frequency of a crystal the amplifier associated with that crystal functions as a modulator and produces a modulation product of high amplitude whose frequency is equal to the sum of these two frequencies. This modulation product, which lies in the passband of the highpass directional filters, is then transmitted to the low frequency terminal of the cable by means of the high frequency transmission path and its presence is easily detected by a detector 40 connected to the cable at the low frequency transmitting end. By tuning the detector 40 the particular frequency of the modulation product may be identified.

As an example of the operation of this test equipment, let us assume that there is a break in the low band transmission path. To locate the break use is made of the fact that each amplifier in each repeater has associated with it a crystal which has a crystal resonant frequency, located outside the traffic band, unique to that repeater. The repeater *n* closest to the low frequency transmitting terminal employs a crystal 31 having the highest resonant frequency of all the crystals. The resonant frequency of crystal 33 associated with repeater number *o* has the lowest resonant frequency of all the crystal resonant frequencies, and the crystal resonant frequencies decline in frequency as one counts from repeater *n* nearest the low frequency transmitting end of the cable toward repeater *o* at the high frequency transmitting end. At each crystal resonant frequency the repeater employing that crystal acts as a modulator, since the crystal removes the feedback which normally suppresses modulation, while, at frequencies removed from crystal resonance the feedback is extremely effective in eliminating modulation products.

With signal source 30 generating a signal in the high frequency band at frequency $f_A$ source 10 is adjusted in frequency to a frequency $f_B$ so that the sum of the frequencies, $f_A+f_B$, from sources 10 and 30 are equal to the crystal resonant frequency of the crystal associated with a particular repeater under test. If this repeater is operating properly and all repeaters between the source 10 and the repeater under test are operating properly a strong signal at the frequency $f_A+f_B$ will be detected by a detector 40 connected to the cable at the low frequency transmitting end. If, on the other hand, there is a break in the low band transmission path between the repeater under test and the low frequency transmitting end of the cable no modulation can take place in that repeater. In this case the detector will read a much lower value at the frequency $f_A+f_B$. Since the feedback networks 34, 34′, 34″ normally introduce a high degree of feedback the presence, or absence, of the modulation product is easily detectable.

To test the high-pass channel the signal sources 10 and 30 are disconnected from the cable and the detector 40 tuned successively to the various crystal frequencies starting with the highest crystal frequency, namely, that associated with the repeater *n* closest to the low frequency transmitting end of the system. The detector 40 is then successively tuned to the next lower crystal frequency until the crystal resonant frequency of repeater *o* is reached. The crystal at each repeater has the effect of cutting down the feedback at the resonant frequency of the crystal associated with that repeater, so that each repeater will develop a relatively large amount of noise at its crystal resonant frequency. At each crystal resonant frequency, therefore, there should be a relatively large amount of noise transmitted to the detector through the high frequency path due to the reduction in feedback by some 30 db at each such frequency while at all other frequencies the noise level is much lower. Thus by tuning the detector 40 first to the crystal resonant frequency of the crystal associated with the repeater closest to the low frequency transmitting end of the cable and "working back" by successively tuning the detector to the frequency of the crystal associated with the next repeater a fault in the high frequency transmission path may be located.

There is shown in FIG. 2 a two-wire block diagram of each repeater employing a typical feedback amplifier. Each amplifier employs a feedback network beta which is connected between the amplifier and the loads to provide series feedback in the manner shown on page 160 of Electron-Tube Circuits by Samuel Seely, published by McGraw-Hill Book Company 1958. The crystal is connected across a pair of terminals of the feedback network so that at the resonant frequency of the crystal the series feedback path beta is shorted out so that the gain of the amplifier is increased appreciably.

Thus in accordance with this invention a failure or tranmission impairment in the low-pass filters, amplifiers or high-pass filters may be located without the necessity for the addition of substantial apparatus to each repeater or the use of equipment at the terminals which is alien to the carrier frequency technique such as pulse transmitters and the like. All that is required to be added to each repeater is a crystal which at its resonant frequency effectively removes the feedback path of the amplifier and thus results in the formation of intermodulation products of high amplitude.

It is to be understood that the above described arrangement is only illustrative of the application of the principles of the invention. Numerous other arrangements may be devised by those skilled in the art without departing from the spirit and scope of the invention.

What is claimed is:

1. In an arrangement for locating a faulty one of a plurality of repeaters each having two forward amplifying paths for amplifying signals of a high frequency transmitted in one direction and signals of a lower frequency transmitted in the opposite direction said repeaters being spaced along a transmission line connecting a high frequency transmitting terminal and a low frequency transmitting terminal, means at said high frequency terminal to apply a first signal to said cable, means at said low frequency terminal to apply a second signal of lower frequency than said first signal to said cable, means associated with each repeater to produce a pronounced irregularity in the gain frequency characteristic of said repeater in response to the reception of a predetermined sum of the frequencies of said applied signals so that said repeater functions as a modulator, and means at said low frequency terminal to detect the modulated signal.

2. In an arrangement for locating a faulty one of a plurality of repeaters each having two forward amplifying paths a first for amplifying signals within a high frequency band transmitted in one direction and a second for amplifying signals within a low frequency band transmitted in a second direction, said repeaters being spaced along a transmission line connecting a high frequency transmitting terminal and a low frequency transmitting terminal, a first signal source generating signals within said high frequency band connected to said high frequency transmitting terminal, a second signal source generating signals within said low frequency band connected to said low frequency transmitting terminal, means associated with each repeater to produce a pronounced irregularity in the gain frequency characteristic of said repeater in response to the reception of a predetermined sum of the frequencies of said applied signals so that said repeater functions as a modulator to produce a modulated signal whose frequency is equal to the sum of the frequencies of said applied signals said modulated signal being transmitted to said low frequency transmitting terminal through the high frequency transmission path of said repeaters, and a detector at said low frequency terminal to detect said modulated signal.

3. In an arrangement for locating a faulty one of a plurality of repeaters each having two forward amplifying paths employing negative feedback, a first of said paths serving to amplify signals within a high frequency band transmitted in one direction and the second of said paths serving to amplify signals within a low frequency band transmitted in the opposite direction, said repeaters being spaced along a transmission line connecting a high frequency transmitting terminal and a low frequency transmitting terminal, a first signal source generating signals within said high frequency band said source being connected to said cable at said high frequency transmitting terminal, a second signal source generating signals within said low frequency band connected to said cable at said low frequency transmitting terminal, a crystal connected to the negative feedback path of each repeater each of said crystals resonating at a frequency unique to a particular repeater to remove the negative feedback of the repeater amplifier to which it is associated to cause the amplifier to act as a modulator in response to the reception of signals from said sources the sum of whose frequencies is equal to the resonant frequency of the crystal and produce a modulated signal whose frequency is equal to said sum of said signals, and a detector at said low frequency terminal to detect said modulated signal.

4. In an arrangement for locating a faulty one of a plurality of repeaters each having two forward amplifying paths employing negative feedback, a first of said paths serving to amplify signals within a low frequency band transmitted in one direction and the second of said paths serving to amplify signals within a low frequency band transmitted in the opposite direction, said repeaters being spaced along a transmission line connecting a high frequency transmitting terminal and a low frequency transmitting terminal, a crystal connected to the negative feedback path of each repeater amplifier each of said crystals resonating at a frequency unique to a particular repeater, tunable detection means at said low frequency transmitting terminal to determine the presence of noise at each crystal resonant frequency as received at said low frequency transmitting terminal, a first signal source generating signals within said high frequency band, a second signal source generating signals within said low frequency band, means to connect said first signal source to said cable at said high frequency transmitting terminal and said second signal source to said cable at said low frequency transmitting terminal, and means to successively adjust the frequencies of the signals generated by said sources so that the sum of the frequencies of the signals generated by said sources is equal to a crystal resonant frequency, said tunable detection means then indicating a strong modulation product at that frequency.

References Cited

UNITED STATES PATENTS 3,189,694 6/1965 Frankton ---------- 179—175.31

KATHLEEN H. CLAFFY, *Primary Examiner.*

A. McGILL, *Assistant Examiner.*